United States Patent
Ueno et al.

(10) Patent No.: US 6,802,989 B1
(45) Date of Patent: Oct. 12, 2004

(54) LIQUID CRYSTAL POLYESTER RESIN

(75) Inventors: Ryuzo Ueno, Nishinomiya (JP); Masaya Kitayama, Takaraduka (JP); Kiichi Kometani, Ikeda (JP); Hiroyuki Kato, Kawanishi (JP); Kazunori Ueda, Takarazuka (JP)

(73) Assignee: Kabushiki Kaisha Ueno Seiyaku Oyo Kenkyusho, Osaka (JP)

( * ) Notice: Subject to any disclaimer, the term of this patent is extended or adjusted under 35 U.S.C. 154(b) by 139 days.

(21) Appl. No.: 10/009,613

(22) PCT Filed: Apr. 16, 2001

(86) PCT No.: PCT/JP01/03242

§ 371 (c)(1),
(2), (4) Date: Dec. 14, 2001

(87) PCT Pub. No.: WO01/81449

PCT Pub. Date: Nov. 1, 2001

(30) Foreign Application Priority Data

Apr. 20, 2000 (JP) ........................................ 2000-119762

(51) Int. Cl.[7] .............................................. C09K 19/52
(52) U.S. Cl. ............................. 252/299.01; 252/299.63; 252/299.67; 349/183
(58) Field of Search ...................... 252/299.01, 299.6, 252/299.62, 299.63, 299.64, 299.65, 299.66, 299.67; 349/182, 183

(56) References Cited

U.S. PATENT DOCUMENTS

| | | | | |
|---|---|---|---|---|
| 4,731,475 A | * | 3/1988 | Tanimoto et al. | 562/475 |
| 5,124,477 A | * | 6/1992 | Suzuki et al. | 562/424 |
| 5,198,572 A | | 3/1993 | White et al. | |
| 5,397,502 A | | 3/1995 | Waggoner et al. | |
| 5,891,532 A | * | 4/1999 | Furuta et al. | 428/1 |
| 5,977,405 A | * | 11/1999 | Samuels et al. | 562/424 |
| 6,300,459 B1 | * | 10/2001 | Kaneko et al. | 528/196 |

FOREIGN PATENT DOCUMENTS

| | | | | |
|---|---|---|---|---|
| EP | 0 380 286 | * | 8/1990 | C08G/63/60 |
| JP | 08 511573 | | 12/1996 | |
| JP | A-8-511573 | | 12/1996 | |
| WO | WO 94 29366 | | 12/1994 | |

\* cited by examiner

*Primary Examiner*—Mark F. Huff
*Assistant Examiner*—Jennifer R. Sadula
(74) *Attorney, Agent, or Firm*—Sherman & Shalloway

(57) ABSTRACT

A liquid crystal polyester resin comprising 1 to 500 mmol % of a recurring unit derived from 4-hydroxyisophthalic acid and/or salicylic acid as a comonomer and 10 to 5,000 ppm in terms of an alkali metal of an alkali metal compound. This resin has excellent colorability, improved heat resistance and high mechanical properties.

6 Claims, No Drawings

LIQUID CRYSTAL POLYESTER RESIN

FIELD OF THE INVENTION

The present invention relates to a liquid crystal polyester. More specifically, it relates to a liquid crystal polyester resin having excellent colorability, improved heat resistance and high mechanical properties.

DESCRIPTION OF THE PRIOR ART

A thermotropi liquid crystal polyester resin (to be referred to as "liquid crystal polyester resin" or abbreviated as "LCP" hereinafter) is increasingly used in not only molded articles but also fibers and films due to its excellent mechanical properties such as heat resistance and stiffness, chemical resistance and dimensional stability. Particularly in information and communication fields such as personal computers and portable telephones, parts are becoming more highly integrated, smaller in size and thickness, and lower in height rapidly, there are many cases where an extremely thin portion having a thickness of 0.5 mm or less is formed, and the consumption of the liquid crystal polyester resin is greatly expanding due to its characteristic properties such as excellent moldability, that is, flowability and the formation of no flash which is not seen in other resins.

Meanwhile, many proposals have been made for further improvement of suchproperties as flowability, heat resistance and mechanical properties at the time of polymerization of a liquid crystal polyester resin composition. JP-A 8-511573 (the term"JP-A" as used herein means an"unexamined published Japanese patent application") discloses a liquid crystal polyester resin composition which is produced by containing an alkali metal in a specific monomer and copolymerizing it and has improved heat resistance.

However, there is still room for the improvement of color uniformness and color strength on coloring the liquid crystal polyester resin composition by a colorant such as carbon black or azo pigment and use thereof in fields that require color uniformness and color strength on coloring is limited.

Then, a liquid crystal polyester resin which has excellent colorability, improved heat resistance and high mechanical properties has been desired.

SUMMARY OF THE INVENTION

The inventors of the present invention have conducted intensive studies and have found that a liquid crystal polyester resin having excellent colorability, improved heat resistance and high mechanical properties is obtained by copolymerizing a trace amount of 4-hydroxyisophthalic acid and/or salicylic acid with another polymerizable monomer and containing a specific amount of an alkali metal ion in the copolymer. The present invention has been accomplished based on this finding.

That is, the present invention provides a liquid crystal polyester resin which comprises 1 to 500 mmol % of a recurring unit derived from 4-hydroxyisophthalic acid and/ or salicylic acid as a comonomer and 10 to 5,000 ppm in terms of an alkali metal of an alkali metal compound. This resin is a liquid crystal polyester resin which has excellent colorability, improved heat resistance and high mechanical properties and solves the above problems.

DETAILED DESCRIPTION OF THE PREFERRED EMBODIMENT

The liquid crystal polyester resin of the present invention comprises 1 to 500 mmol %, preferably 3 to 200 mmol %, more preferably 5 to 100 mmol % of a recurring unit derived from 4-hydroxyisophthalic acid and/or salicylic acid as a constituent component based on the total of all the recurring units. When4-hydroxyisophthalic acid and salicylic acid are used in combination, the weight ratio of 4-hydroxyisophthalic acid to salicylic acid is preferably 10/90 to 90/10, more preferably 30/70 to 70/30.

The liquid crystal polyester resin of the present invention further comprises 10 to 5,000 ppm, preferably 20 to 2,000 ppm, more preferably 50 to 500 ppm in terms of an alkali metal of an alkali metal compound.

Examples of the alkali metal include lithium, sodium, potassium, cesium and rubidium. Out of these, sodium and potassium are preferred and potassium is more preferred.

The above alkali metal compound is preferably an alkali metal salt exemplified by sulfates, carbonates, bicarbonates, nitrates, carboxylates and halogen salts of alkali metals. Out of these, carboxylates, sulfates and carbonates are preferred. The carboxylates are preferably aliphatic carboxylates having 2 to 6 carbon atoms and carboxylates having a polymer recurring unit, such as 4-hydroxybenzoates, 4-hydroxyisophthalates, salicylates, 2-hydroxy-6-naphthoates and other polymerizable monomer salts derived from aromatic carbonyl recurring units.

The average particle diameter represented by the volume average particle diameter of an alkali metal salt existent in the resin composition is preferably 0.01 to 500 μm, more preferably 0.05 to 150 μm.

The liquid crystal polyester resin of the present invention is not particularly limited if it is a polyester resin which forms an anisotropic molten phase, called "thermotropicliquid crystal polyester resin" by people having ordinary skill in the art and included in the scope of the present invention.

The anisotropic molten phase can be confirmed by a general polarization inspection method using a cross polarizer, that is, observing a sample mounted on a hot stage in a nitrogen atmosphere.

The liquid crystal polyester resin of the present invention is preferably a liquid crystal polyester which forms an anisotropic molten phase and comprises monomer units selected from an aromatic hydroxycarboxylic acid, aromatic dicarboxylic acid, aromatic diol, aromatic hydroxyamine, aromatic diamine and aromatic aminocarboxylic acid, particularly monomer units selected from an aromatic dicarboxylic acid, aromatic diol and aromatic hydroxycarboxylic acid as constituent units. The liquid crystal polyester resin of the present invention includes a liquid crystal polyester amide containing an amide group in the molecular chain as understood from the above examples of the monomer units.

Specific examples of the aromatic hydroxycarboxylic acid include 4-hydroxybenzoic acid, 3-hydroxybenzoic acid, 2-hydroxybenzoic acid, 2-hydroxy-6-naphthoic acid, 2-hydroxy-5-naphthoic acid, 3-hydroxy-2-naphthoic acid, 2-hydroxy-3-naphthoicacid, 4'-hydroxyphenyl-4-benzoicacid, 3'-hydroxyphenyl-4-benzoic acid, 4'-hydroxyphenyl-3-benzoic acid, alkyl, alkoxy and halogen substituted products thereof, and ester forming derivatives thereof. Out of these, 4-hydroxybenzoic acid and 2-hydroxy-6-naphthoic acid are preferred because the characteristic properties and melting point of the obtained polyester can be easily adjusted.

Specific examples of the aromatic dicarboxylic acid include aromatic dicarboxylic acids such as terephthalic acid, isophthalic acid, 2,6-naphthalenedicarboxylic acid, 1,6-naphthalenedicarboxylic acid, 2,7-naphthalenedicarboxylic acid, 4,4'-dicarboxybiphenyl, bis(4-carboxyphenyl)ether, bis(4-carboxyphenoxy)butane, bis(4-carboxyphenyl)ethane, bis(3-carboxyphenyl)ether and bis(3-carboxyphenyl)ethane, alkyl, alkoxy and halogen substituted products thereof, and ester forming derivatives thereof. Out of these, terephthalic acid, 2,6-naphthalenedicarboxylic acid are preferred because the mechanical properties, heat resistance, melting point and moldability of the obtained liquid crystal polyester are easily adjusted to appropriate levels.

Specific examples of the aromatic diol include aromatic diols such as hydroquinone, resorcin, 2,6-dihydroxynaphthalene, 2,7-dihydroxynaphthalene, 1,6-dihydroxynaphthalene, 4,4'-dihydroxybiphenyl, 3,3'-dihydroxybiphenyl, 3,4'-dihydroxybiphenyl, 4,4'-dihydroxybiphenyl ether and bis(4-hydroxyphenyl)ethane, alkyl, alkoxy and halogen substituted products thereof, and ester forming derivatives thereof. Out of these, hydroquinone and 4,4'-dihydroxybiphenyl are preferred from the viewpoint of reactivity during polymerization and the characteristic properties of the obtained liquid crystal polyester.

Specific examples of the aromatic hydroxyamine, aromatic diamine and aromatic aminocarboxylic acid include aromatic hydroxyamines such as 4-aminophenol, N-methyl-4-aminophenol, 3-aminophenol, 3-methyl-4-aminophenol, 4-amino-1-naphthol, 4-amino-4'-hydroxydiphenyl, 4-amino-4'-hydroxydiphenyl ether, 4-amino-4'-hydroxybiphenyl methane, 4-amino-4'-hydroxybiphenyl sulfide and 4,4'-diaminodiphenyl sulfone; aromatic diamines such as 1,4-phenylenediamine, N-methyl-1,4-phenylenediamine, N,N'-dimethyl-1,4-phenylenediamine, 4,4'-diaminophenylsulfide (thiodianiline), 2,5-diaminotoluene, 4,4'-ethylenedianiline, 4,4'-diaminodiphenoxyethane, 4,4'-diaminobiphenylmethane (methylenedianiline) and 4,4'-diaminodiphenylether (oxydianiline); aromatic aminocarboxylic acids such as 4-aminobenzoic acid, 2-amino-6-naphthoic acid and 2-amino-7-naphthoic acid; and ester forming derivatives thereof.

The liquid crystal polyester of the present invention may comprise another monomer such as an alicyclic dicarboxylic acid, aliphatic diol, alicyclic diol, aromatic mercaptocarboxylic acid, aromatic dithiol or aromatic mercaptophenol in limits not prejudicial to the object of the present invention in addition to the above monomer. This component is used in an amount of 10 mol % or less based on the total of the aromatic hydroxycarboxylic acid, aromatic dicarboxylic acid and aromatic diol.

Examples of the alicyclic dicarboxylic acid, aliphatic diol and alicyclic diol include alicyclic dicarboxylic acids such as hexahydroterephthalic acid; alicyclic diols such as trans-1,4-cyclohexanediol, cis-1,4-cyclohexanediol, trans-1,4-cyclohexanedimethanol, cis-1,4-cyclohexanedimethanol, trans-1,3-cyclohexanediol, cis-1,2-cyclohexanediol and trans-1,3-cyclohexanedimethanol; linear and branched aliphatic diols such as ethylene glycol, 1, 3-propanediol, 1,4-butanediol and neopentyl glycol; and ester forming derivatives thereof.

Examples of the aromatic mercaptocarboxylic acid, aromatic dithiol and aromatic mercaptophenol include aromatic mercaptocarboxylic acids such as 4-mercaptobenzoic acid, 2-mercapto-6-naphthoic acid and 2-mercapto-7-naphthoic acid; aromatic dithiols such as benzene-1,4-dithiol, benzene-1,3-dithiol, 2,6-naphthalene-dithiol and 2,7-naphthalene-dithiol; aromatic mercaptophenols such as 4-mercaptophenol, 3-mercaptophenol, 6-mercaptophenol and 7-mercaptophenol; and ester forming derivatives thereof.

Liquid crystal polyesters comprising the above components are divided into liquid crystal polyesters which do not form an anisotropic molten phase and liquid crystal polyesters which form an anisotropic molten phase according to the constituent components, composition in the polyester and sequence distribution of the liquid crystal polyesters.

The liquid crystal polyester used in the present invention is limited to a liquid crystal polyester which forms an anisotropic molten phase.

The liquid crystal polyester preferably consists of the following monomer constituent units: 4-hydroxybenzoic acid/2-hydroxy-6-naphthoic acid copolymer, 4-hydroxybenzoic acid/terephthalic acid/4,4'-dihydroxybiphenyl copolymer, 4-hydroxybenzoic acid/terephthalic acid/isophthalic acid/4,4'-dihydroxybiphenyl copolymer, 4-hydroxybenzoic acid/terephthalic acid/isophthalic acid/4,4'-dihydroxybiphenyl/hydroquinone copolymer, 4-hydroxybenzoic acid/terephthalic acid/hydroquinone copolymer, 4-hydroxybenzoic acid/2-hydroxy-6-naphthoic acid/terephthalic acid/4,4'-dihydroxybiphenyl copolymer, 4-hydroxybenzoic acid/2-hydroxy-6-naphthoic acid/terephthalic acid/hydroquinone copolymer, 4-hydroxybenzoic acid/2,6-naphthalenedicarboxylic acid/4,4'-dihydroxybiphenyl copolymer, 4-hydroxybenzoic acid/terephthalic acid/2,6-naphthalenedicarboxylic acid/hydroquinone copolymer, 4-hydroxybenzoic acid/2,6-naphthalenedicarboxylic acid/hydroquinone copolymer, 4-hydroxybenzoic acid/2-hydroxy-6-naphthoic acid/2,6-naphthalenedicarboxylic acid/hydroquinone copolymer, 4-hydroxybenzoic acid/terephthalic acid/2,6-naphthalenedicarboxylic acid/hydroquinone/4,4'-dihydroxybiphenyl copolymer, 4-hydroxybenzoic acid/terephthalic acid/4-aminophenol copolymer, 4-hydroxybenzoic acid/2-hydroxy-6-naphthoic acid/terephthalic acid/4-aminophenol copolymer, 4-hydroxybenzoic acid/terephthalic acid/4,4'-dihydroxybiphenyl/4-aminophenol copolymer, 4-hydroxybenzoic acid/terephthalic acid/ethylene glycol copolymer, 4-hydroxybenzoic acid/terephthalic acid/4,4'-dihydroxybiphenyl/ethylene glycol copolymer, 4-hydroxybenzoic acid/2-hydroxy-6-naphthoic acid/terephthalic acid/ethylene glycol copolymer and 4-hydroxybenzoic acid/2-hydroxy-6-naphthoic acid/terephthalic acid/4,4'-dihydroxybiphenyl/ethylene glycol copolymer.

Out of these, the liquid crystal polyester in the present invention preferably consists of a recurring unit represented by the following formula (I) and at least one of a recurring unit represented by the following formula (II) and a recurring unit represented by the following formula (III) as constituent components.

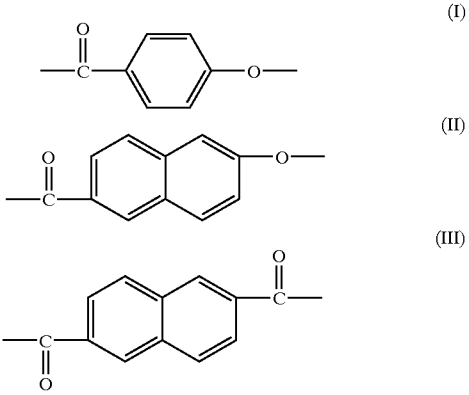

A monomer used to introduce the recurring unit of the formula (I) is 4-hydroxybenzoic acid, a monomer used to introduce the recurring unit of the formula (II) is 2-hydroxy-6-naphthoic acid and a monomer used to introduce the recurring unit of the formula (III) is 2,6-naphthalenedicarboxylic acid.

When the recurring units of the formulas (I) and (II) are used, the molar ratio of the recurring unit of the formula (I)

to the recurring unit of the formula (II) is preferably 10/90 to 90/10, more preferably 80/20 to 55/45. When the recurring units of the formulas (I) and (III) are used, the molar ratio of the recurring unit of the formula (I) to the recurring unit of the formula (III) is preferably 90/10 to 50/50, more preferably 85/15 to 60/40.

When the recurring units of the formulas (I), (II) and (III) are used, the molar ratio of the recurring unit of the formula (I) to the recurring unit of the formula (II) is in the above range and the molar ratio of the total of the recurring units of the formulas (I) and (II) to the recurring unit of the formula (III) is preferably 90/10 to 50/50, more preferably 85/15 to 60/40.

When the recurring unit of the formula (III) is used, a recurring unit derived from an equimolar amount of an aromatic diol is preferably contained.

The liquid crystal polyester resin of the present invention can be produced by adding an alkali metal compound and 4-hydroxyisophthalic acid and/or salicylic acid before polymerization or during polymerization. In this case, the alkali metal compound and 4-hydroxyisophthalic acid and/or salicylic acid are preferably used together with an aromatic oxybenzoic acid such as 4-hydroxybenzoic acid in polymerization.

The method of producing the liquid crystal polyester resin of the present invention is not particularly limited and conventionally known methods of polycondensing a polyester which forms an ester bond and consists of a combination of the above constituent components, for example, melt acidolysis and slurry polymerization may be used.

The melt acidolysis is preferably used in the present invention. In this method, monomers are first heated to form a molten solution of a reaction product and a reaction is further continued to obtain a molten polymer. A vacuum may be applied to facilitate the removal of volatile components (such as acetic acid, water, etc.) by-produced in the final stage of condensation.

The slurry polymerization is to carry out a reaction in the presence of a heat exchange fluid so as to obtain a solid product suspended in a heat exchange medium.

In both the above melt acidolysis and slurry polymerization, polymerizable monomer components used for the production of a liquid crystal polyester may be used in a reaction as a modified form obtained by esterifying a hydroxyl group, that is, a lower acyl ester at normal temperature. The lower acyl group preferably has 2 to 5 carbon atoms, more preferably 2 or 3 carbon atoms. Particularly preferably, acetic acid esters of the above monomer components are used in the reaction.

The lower acyl esters of the monomers may be synthesized by acylation or may be formed in a reaction system by adding an acylating agent such as acetic anhydride to the monomers at the time of producing a liquid crystal polyester.

In both the above melt acidolysis and slurry polymerization, a catalyst may be optionally used during a reaction.

Examples of the catalyst include organic tin compounds such as dialkyltin oxides (such as dibutyltin oxide) and diaryltin oxides; organic titanium compounds such as titanium dioxide, antimony trioxide, alkoxytitanium silicate and titanium alkoxide; alkali and alkaline earth metal salts of carboxylic acids (such as potassium acetate); and gaseous acid catalysts such as Lewis acid (such as $BF_3$) and hydrogen halide (such as HCl).

The amount of the catalyst is preferably 10 to 10,000 ppm, more preferably 20 to 200 ppm based on the total of the monomers.

The liquid crystal polyester resin of the present inventions preferably a liquid crystal polyester resin whose logarithmic viscosity can be measured in pentafluorophenol. In this case, the logarithmic viscosity measured at a concentration of 0.1 g/dl and a temperature of 60° C. is preferably 0.3 dl/g or more, more preferably 0.5 to 10 dl/g, much more preferably 1 to 8 dl/g.

The liquid crystal polyester resin of the present invention has a melt viscosity measured with a capillary rheometer of preferably 1 to 10,000 Pa·s, more preferably 5 to 300 Pa·s.

At least one fibrous, lamellar or powdery reinforcement and/or filler may be blended with the liquid crystal polyester resin of the present invention in addition to the liquid crystal polyester resin as a matrix.

Examples of the fibrous filler and reinforcement include glass fiber, silica alumina fiber, alumina fiber, carbon fiber and aramid fiber. Out of these, glass fiber is preferred because of good balance between physical properties and cost.

Examples of the lamellar or powdery filler include talc, mica, graphite, wollastonite, calcium carbonate, dolomite, clay, glass flake, glass bead, barium sulfate and titanium oxide.

The total amount of the fibrous, lamellar and powdery reinforcement and/or filler in the liquid crystal polyester resin of the present invention is preferably 0 to 100 parts by weight, more preferably 20 to 70 parts by weight based on 100 parts by weight of the liquid crystal polyester resin. When the amount of the fibrous, lamellar and/or powdery inorganic filler is larger than 100 parts by weight, moldability may deteriorate or the abrasion of the cylinder or mold of a molding machine may increase.

General additives including a mold-release agent such as a higher fatty acid, higher fatty acid ester, higher fatty acid amide, higher fatty acid metal salt, polysiloxane or fluororesin; colorant such as a dye or pigment; antioxidant; thermal stabilizer; ultraviolet light absorber; antistatic agent; and surfactant may be added to the liquid crystal polyester resin of the present invention alone or in combination of two or more.

A substance having an externally lubricating effect such as a higher fatty acid, higher fatty acid ester, higher fatty acid metal salt or fluorocarbon-based surfactant may be adhered to a pellet to be molded.

Other resin components such as thermoplastic resins including polyamides, polyesters, polyphenylene sulfides, polyether ketones, polycarbonates, polyphenylene ethers and modified products thereof, polysulfones, polyether sulfones and polyether imides, and thermosetting resins including phenolic resins, epoxy resins and polyimide resins may be added alone or in combination of two or more.

The above filler, reinforcement and the like are added to the polyester resin and melt kneaded using a Banbury mixer, kneader or single-screw or twin-screw extruder at a temperature near the melting point of the liquid crystal polyester resin composition to (melting point+100)° C. to obtain a composition.

Conventionally known injection molding, compression molding, extrusion molding or blow molding may be used for the obtained liquid crystal polyester resin and liquid crystal polyester resin composition and the obtained molded articles, films and fibers are useful for electric and electronic parts, mechanical parts, auto parts and the like.

EXAMPLES

The following examples are provided for the purpose of further illustrating the present invention but are in no way to be taken as limiting.

The following abbreviations are used in the examples
LCP: liquid crystal polyester
SA: salicylic acid
HIP: 4-hydroxyisophthalic acid
Used Monomers
POB: 4-hydroxybenzoic acid having SA and HIP contents below the detection limit of high performance liquid chromatography and each contents of potassium and sodium measured by atomic-absorption spectroscopy of 1 ppm
BON6: 2-hydroxy-6-naphthoic acid having each contents of potassium and sodium measured by atomic-absorption spectroscopy of 1 ppm
TPA: terephthalic acid having an alkali metal content of less than 1 ppm
HQ: hydroquinone having an alkali metal content of less than 1 ppm
NDA: 2,6-naphthalenedicarboxylic acid having an alkali metal content of less than 1 ppm
Polymerization Conditions
  <Polymerization Conditions-1>
  Polymerization conditions of LCP (LCP-1) containing 4-hydroxybenzoic acid and 2-hydroxy-6-naphthoic acid in a molar ratio of 75/25 are given below.

POB and BON6 were charged into a reactor equipped with a stirrer having a torque meter and distillation tube in a total amount of 7.5 mols in the above molar ratio, acetic anhydride was then charged in an amount of 1.025 times the total molar amount of the monomers, the temperature of the reactor was raised to 150° C. in a nitrogen atmosphere, maintained at that temperature for 30 minutes, swiftly raised to 190° C. while the by-produced acetic acid was distilled off and maintained at that temperature for 1 hour. Thereafter, the temperature was further raised to 330° C. over 3.5 hours, and the pressure of the reactor was reduced to 20 mmHg over about 30 minutes, a polymerization reaction was terminated when predetermined torque was indicated, and the reaction product was taken out from the reactor using a take-out tool and pelletized by a grinder. The amount of the acetic acid which distilled out was almost a theoretical value.
  <Polymerization Conditions-2>
  Polycondensation conditions for LCP (LCP-2) containing 4-hydroxybenzoic acid, 2-hydroxy-6-naphthoic acid, terephthalic acid and hydroquinone in a molar ratio of 65/15/10/10 are given below.

A reaction was carried out in the same manner as the polycondensation conditions-1 except that POB, BON6, TPA and HQ were charged in the above ratio, and the temperature of the reactor was raised to 190° C., maintained at that temperature for 1 hour, and further raised to 360° C. over 3.75 hours.
  <Polymerization Conditions-3>
  Polycondensation conditions for LCP (LCP-3) containing 4-hydroxybenzoic acid, 2,6-naphthalenedicarboxylic acid and hydroquinone in a molar ratio of 58/21/21 are given below.

A reaction was carried out in the same manner as the polycondensation conditions-1 except that POB, NDA and HQ were charged in the above ratio, and the temperature of the reactor was raised to 150° C., maintained at that temperature 20 for 30 minutes, raised to 190° C., maintained at that temperature for 1 hour, and further raised to 360° C. over 3.75 hours.

Preparation of Black LCP Compounded and Test Sample Preparation Method

100parts by weight of a pellet of the resin obtained by polycondensation was melt kneaded with 1 part by weight of carbon black (Mitsubishi Carbon Black #45 of Mitsubishi Kagaku Co., Ltd.) using the PCM-30 twin-screw extruder of Ikegai Co., Ltd. and the obtained kneaded product was pelletized using a strand cutter.

This black pellet was injection molded by the MINIMAT 26/15 injection molding machine of Sumitomo Heavy Industries, Ltd. (cylinder temperature: 350–350–310–280° C., mold temperature: 70° C.) to obtain a strip-like test sample measuring 12.7×64×3.0 mm.
Colorability Evaluation Method The strip-like flexural test sample was set on the window frame (10×7.5 mm in diameter) of a spectrophotometer (Macbeth COLOR-EYE7000 of Sakata Inks Co., Ltd.) to measure $L^*$. $L^*$ is a numerical value of brightness. Since the lower the value the more the test sample is colored black, this value is used to evaluate the colorability of each example.
Izod Impact Strength Measurement Method This was measured in accordance with ASTM D256.

Example 1

Deacetation polymerization was carried out in accordance with the method shown in "polymerization conditions-1" by charging the composition of LCP-1, SA and potassium sulfate into the reactor to ensure that the amount of the SA residual group should become 22.5 mmol % and the content of potassium sulfate in the resin should become 669 ppm at the start of polymerization. The colorability of the obtained polymer was evaluated and the Izod impact strength thereof was measured. The amount of potassium measured by the atomic-absorption method of the obtained pellet after polymerization was 290 ppm.

Example 2

Polymerization and evaluation were carried out in the same manner as in Example 1 except that HIP was used in place of SA and charged into the reactor to ensure that the amount of the HIP residual group should become 23.0 mmol % at the start of polymerization. The amount of potassium measured by the atomic-absorption method of the obtained pellet after polymerization was 305 ppm.

Example 3

Polymerization and evaluation were carried out in the same manner as in Example 1 except that SA and HIP were charged into the reactor to ensure that the amount of the SA residual group should become 22.5 mmol % and the amount of the HIP residual group should become 23.0 mmol % at the start of polymerization. The amount of potassium measured by the atomic-absorption method of the obtained pellet after polymerization was 292 ppm.

Example 4

Deacetation polymerization was carried out in accordance with the method shown in "polymerization method-2" by charging the composition of LCP-2, SA, HIP and potassium sulfate into the reactor to ensure that the amount of the SA residual group should become 45.0 mmol %, the amount of the HIP residual group should become 50.0 mmol % and the content of potassium sulfate in the resin should become 1,003 ppm at the start of polymerization, and the evaluation of colorability and the measurement of an Izod impact strength were carried out in the same manner as in Example 1. The amount of potassium measured by the atomic-absorption method of the obtained pellet after polymerization was 437 ppm.

Example 5

Deacetation polymerization was carried out in accordance with the method shown in "polymerization method-3" by charging the composition of LCP-3, SA, HIP and potassium sulfate into the reactor to ensure that the amount of the SA residual group should become 25.0 mmol %, the amount of the HIP residual group should become 50.0 mmol % and the content of potassium sulfate in the resin should become 700 ppm at the start of polymerization, and the evaluation of colorability and the measurement of an Izod impact strength were carried out in the same manner as in Example 1. The amount of potassium measured by the atomic-absorption method of the obtained pellet after polymerization was 325 ppm.

Comparative Example 1

Deacetation polymerization was carried out in accordance with the method shown in "polymerization method-1" by charging the composition of LCP-1 and potassium sulfate into the reactor to ensure that the content of potassium sulfate in the resin should become 669 ppm at the start of polymerization, and the evaluation of colorability and the measurement of an Izod impact strength were carried out in the same manner as in Example 1. The amount of potassium measured by the atomic-absorption method of the obtained pellet after polymerization was 303 ppm.

Comparative Example 2

Deacetation polymerization was carried out in accordance with the method shown in "polymerization method-1" by charging SA and HIP into the reactor to ensure that the amount of the SA residual group should become 22.5 mmol % and the amount of the HIP residual group should become 23.0 mmol % at the start of polymerization, and the evaluation of colorability and the measurement of an Izod impact strength were carried out in the same manner as in Example 1. The amount of potassium measured by the atomic-absorption method of the obtained pellet after polymerization was 3 ppm.

Comparative Example 3

The procedure of Example 1 was repeated except that HIP and potassium sulfate were added to the composition of LCP-1 to ensure that the amount of the HIP residual group should become 680 mmol % and the content of potassium sulfate in the resin should become 669 ppm at the start of polymerization. The amount of potassium measured by the atomic-absorption method of the obtained pellet after polymerization was 288 ppm.

Comparative Example 4

The colorability was evaluated and the Izod impact strength was measured in the same manner as in Example 1 except that HIP and potassium sulfate were added to the composition of LCP-1 to ensure that the amount of the HIP residual group should become 800 mmol % and the content of potassium sulfate in the resin should become 669 ppm at the start of polymerization. The amount of potassium measured by the atomic-absorption method of the obtained pellet after polymerization was 293 ppm.

Comparative Example 5

Deacetation polymerization was carried out in accordance with the method shown in "polymerization method-2" by charging the composition of LCP-2 and potassium sulfate into the reactor to ensure that the content of potassium sulfate in the resin should become 1,003 ppm at the start of polymerization, and the evaluation of colorability and the measurement of an Izod impact strength were carried out in the same manner as in Example 1. The amount of potassium measured by the atomic-absorption method of the obtained pellet after polymerization was 441 ppm.

Comparative Example 6

Deacetation polymerization was carried out in accordance with the method shown in "polymerization method-3" by charging the composition of LCP-3 and potassium sulfate into the reactor to ensure that the content of potassium sulfate in the resin should become 700 ppm at the start of polymerization, and the evaluation of colorability and the measurement of an Izod impact strength were carried out in the same manner as in Example 1. The amount of potassium measured by the atomic-absorption method of the obtained pellet after polymerization was 322 ppm.

Table 1 shows the above evaluation results.

TABLE 1

| | | examples | | | | | comparative examples | | | | | |
|---|---|---|---|---|---|---|---|---|---|---|---|---|
| | | 1 | 2 | 3 | 4 | 5 | 1 | 2 | 3 | 4 | 5 | 6 |
| composition | basic composition | LCP-1 | LCP-1 | LCP-1 | LCP-2 | LCP-3 | LCP-1 | LCP-1 | LCP-1 | LCP-1 | LCP-2 | LCP-3 |
| | amount of HIP residual group** (mmol %) | — | 23.0 | 23.0 | 50.0 | 25.0 | — | 23.0 | 680 | — | — | — |
| | amount of SA residual group** (mmol %) | 22.5 | — | 22.5 | 45.0 | 50.0 | — | 22.5 | — | 800 | — | — |
| | amount of potassium sulfate** (ppm) | 669 | 669 | 669 | 1003 | 700 | 669 | — | 669 | 669 | 1003 | 700 |
| | amount of potassium (ppm) | 290 | 305 | 292 | 437 | 325 | 303 | 3 | 288 | 293 | 441 | 322 |

TABLE 1-continued

| | | examples | | | | | comparative examples | | | | |
|---|---|---|---|---|---|---|---|---|---|---|---|
| | | 1 | 2 | 3 | 4 | 5 | 1 | 2 | 3 | 4 | 5 | 6 |
| characteristic properties | L* | 36 | 36 | 34 | 32 | 33 | 42 | 41 | 42 | 42 | 43 | 41 |
| | Izod impact strength (J/m) | 418 | 411 | 426 | 399 | 407 | 384 | 321 | 253 | 287 | 238 | 295 |

(Note)
**content of the substance in the resin calculated from the amount of its charge.

According to the present invention, a liquid crystal polyester resin having excellent colorability by a colorant, improved heat resistance and high mechanical properties can be obtained.

What is claimed is:

1. A liquid crystal polyester resin, which comprises 1 to 500 mmol % of a recurring unit derived from 4-hydroxyisophthalic acid and/or salicylic acid as a constituent component based on the total of all the recurring units and contains 10 to 5,000 ppm in terms of an alkali metal of an alkali metal compound.

2. The liquid crystal polyester resin of claim 1, wherein the alkali metal is potassium and/or sodium.

3. The liquid crystal polyester resin of claim 1, wherein the alkali metal compound is at least one salt selected from the group consisting of a sulfate, carbonate, bicarbonate, nitrate, carboxylate and halogen salt of an alkali metal.

4. The liquid crystal polyester resin of claim 3, wherein the alkali metal salt existent in the resin has an average particle diameter in terms of volume average particle diameter of 0.01 to 500μm.

5. The liquid crystal polyester resin of claim 1 which consists essentially of a recurring unit represented by the following formula (I) and at least one of a recurring unit represented by the following formula (II) and a recurring unit represented by the following formula (III):

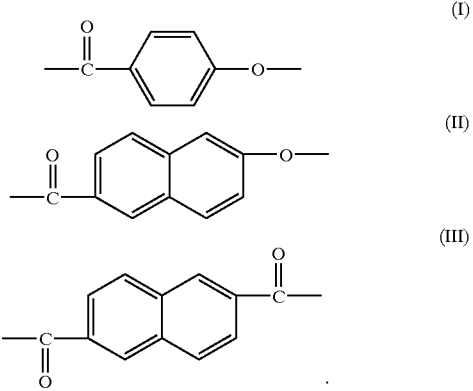

6. The liquid crystal polyester resin of claim 1, wherein the amount of the recurring unit derived from 4-hydroxyisophthalic acid and/or salicylic acid is 5 to 100 mmol %.

* * * * *